US012049676B2

(12) United States Patent
Gogsig et al.

(10) Patent No.: US 12,049,676 B2
(45) Date of Patent: Jul. 30, 2024

(54) METHOD FOR DYEING AND/OR RETANNING OF LEATHER

(71) Applicant: ECCO Sko A/S, Bredebro (DK)

(72) Inventors: Thomas Gogsig, Bredebro (DK); Ilona Francisca Maria Coremans, Bredebro (DK); Stojanka Petrusic, Bredebro (DK)

(73) Assignee: ECCO Sko A/S, Bredebro (DK)

( * ) Notice: Subject to any disclaimer, the term of this patent is extended or adjusted under 35 U.S.C. 154(b) by 229 days.

(21) Appl. No.: 17/607,374

(22) PCT Filed: Apr. 29, 2020

(86) PCT No.: PCT/DK2020/050119
§ 371 (c)(1),
(2) Date: Oct. 28, 2021

(87) PCT Pub. No.: WO2020/221407
PCT Pub. Date: Nov. 5, 2020

(65) Prior Publication Data
US 2022/0220571 A1 Jul. 14, 2022

(30) Foreign Application Priority Data
Apr. 29, 2019 (DK) ............................ PA201970268

(51) Int. Cl.
*C14C 3/00* (2006.01)
*C14C 15/00* (2006.01)
(Continued)

(52) U.S. Cl.
CPC ................ *C14C 15/00* (2013.01); *D06P 1/94* (2013.01); *D06P 3/3286* (2013.01)

(58) Field of Classification Search
CPC .. C14C 15/00; C14C 3/28; C14C 3/30; C14C 3/04; C14C 3/08; C14C 9/02; D06P 1/94; D06P 3/3286; D06P 3/32
(Continued)

(56) References Cited

U.S. PATENT DOCUMENTS 5,512,058 A 4/1996 Gavend et al.
2005/0214464 A1 9/2005 Moriyoshi et al.
(Continued)

FOREIGN PATENT DOCUMENTS

CN 1673394 9/2005
CN 1673394 A * 9/2005 ............... C14C 1/06
(Continued)

OTHER PUBLICATIONS

Prokein et al., Low-chromium- and low-sulphate emission leather tanning intensified by compressed carbon dioxide, Clean Technologies and Environmental Policy vol. 19, pp. 2455-2465 (Year: 2017).*
(Continued)

*Primary Examiner* — Eisa B Elhilo
(74) *Attorney, Agent, or Firm* — Lee & Hayes, P.C.

(57) ABSTRACT

A method for dyeing and/or retanning of leather objects includes providing a leather object. The leather object has been processed by at least a tanning process. The leather object is introduced into a process chamber. The leather object is subjected in the process chamber to a pressurized fluid. The pressure of the pressurized fluid is controlled to reach a supercritical state. The leather object is subjected to a dyeing agent and/or a retanning agent, which dyeing or retanning agent is dissolved and/or transported in the pressurized fluid for at least a predefined period of time while the pressurized fluid is in the supercritical state. The pressure is reduced in the process chamber. The leather object is
(Continued)

Figure 1:
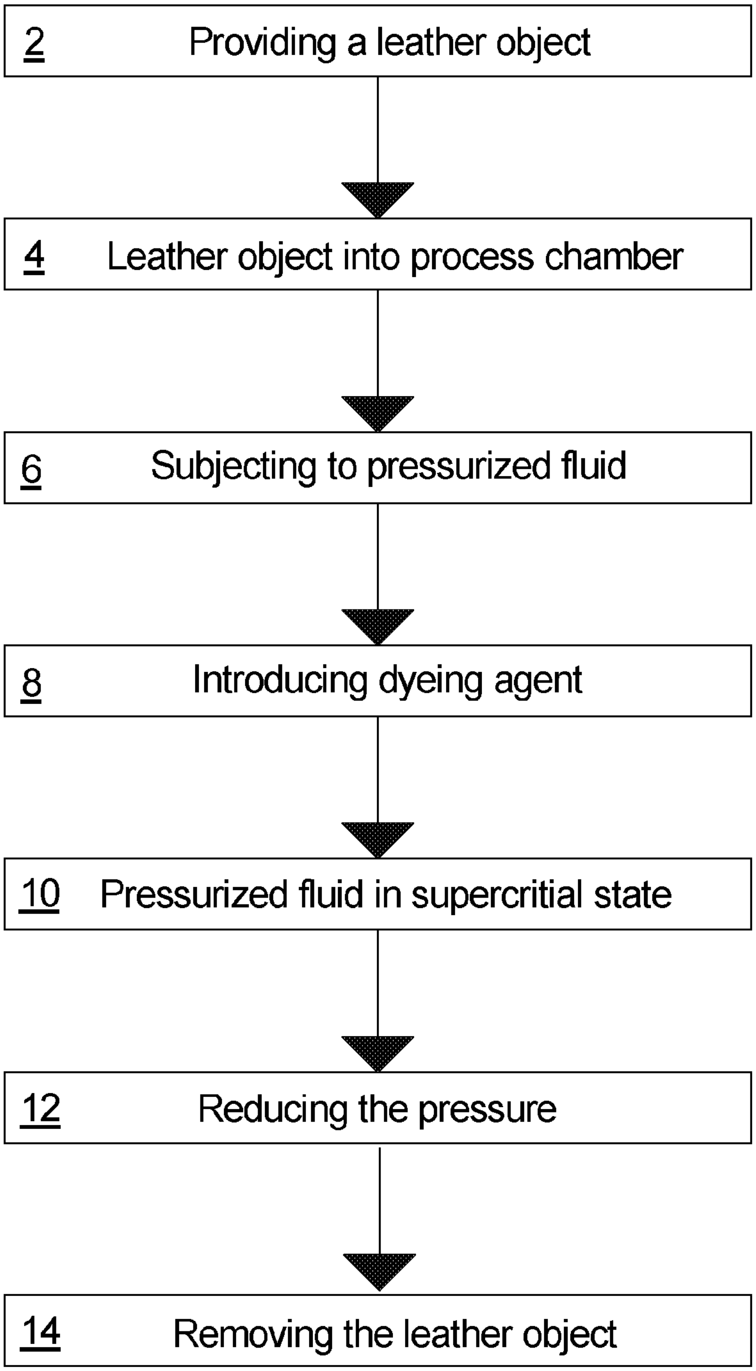

removed from the process chamber. The pressure reduction is controlled over time.

18 Claims, 9 Drawing Sheets

(51) Int. Cl.
*D06P 1/94* (2006.01)
*D06P 3/32* (2006.01)

(58) Field of Classification Search
USPC .............................................................. 8/436
See application file for complete search history.

(56) References Cited

U.S. PATENT DOCUMENTS

| | | | | |
|---|---|---|---|---|
| 2008/0028541 A1* | 2/2008 | Fernandez Cid ....... | D06P 1/384 | |
| | | | 8/474 | |
| 2013/0263383 A1* | 10/2013 | Kang ........................ | C14C 3/28 | |
| | | | 8/94.21 | |

FOREIGN PATENT DOCUMENTS

| | | |
|---|---|---|
| CN | 1958941 A | 5/2007 |
| CN | 101613963 | 12/2009 |
| CN | 107142757 | 9/2017 |
| JP | 2004204189 | 7/2004 |
| WO | WO200131067 | 5/2001 |
| WO | WO200233163 | 4/2002 |
| WO | WO2018149949 | 8/2018 |
| WO | WO2018149950 | 8/2018 |

OTHER PUBLICATIONS

"Method for continuous dyeing of leather", Clarivate Analytics 2017, 2 pages.
Covington, Tony "Tanning Chemistry, The Science of Leather", The University of Northampton, Northampton UK, 2009, 11 pages.
PCT Search Report for corresponding PCT Application No. PCT/DK2020/050119 dated Jul. 27, 2020, 4 pages.
Prokein, M. et al., "Low-chromium- and low-sulphate emission leather tanning intensified by compressed carbon dioxide", Clean Technologies and Environmental Policy, vol. 19, No. 10 Oct. 26, 2017 (2017, 12 pages).

* cited by examiner

METHOD FOR DYEING AND/OR RETANNING OF LEATHER

This Application claims priority to PCT Application No. PCT/DK2020/050119, filed Apr. 29, 2020, which claims priority to DK Patent Application No. PA 2019 70268, filed Apr. 29, 2019, the contents of each of which is incorporated herein by reference.

FIELD OF THE INVENTION

The invention relates to a method for dyeing of leather objects.

BACKGROUND OF THE INVENTION

It is well known within the art of leather making, that dyeing is one of the more important steps as it is usually the first property of the leather to be assessed by the costumer. Dyeing of leather is currently mainly performed with acid dyes, sulfur dyes, direct dyes, premetallized dyes, reactive dyes or basic dyes under wet conditions but acceptable high depths of the color and high wet fastness are difficult and improved solutions are desirable. It is also well-known that water and processing agents such as dye, retanning agents and fatliqour agents are used in large amounts in the leather dyeing processes and may also be energy costly.

An object of the invention is therefore to provide for an advantageous and more environmentally sustainable dyeing method with a high dyeing efficiency and high wet fastness. A further object is assuring the leather quality with all common physical and chemical test standards including high color fastness.

SUMMARY OF THE INVENTION

The invention relates to a method for dyeing and/or retanning of leather objects, said method comprising the steps of

- providing a leather object, which leather object has been processed by at least a tanning process,
- introducing the leather object into a process chamber,
- subjecting the leather object in the process chamber to a pressurized fluid,
- controlling the pressure of the pressurized fluid to reach a supercritical state,
- subjecting the leather object to a dyeing agent and/or a retanning agent, which dyeing or retanning agent is dissolved and/or transported in the pressurized fluid for at least a predefined period of time while the pressurized fluid is in the supercritical state,
- reducing the pressure in the process chamber,
- removing the leather object from the process chamber, wherein the step of reducing the pressure in the process chamber comprises controlling the pressure reduction over time.

Hereby, the dyeing/colouring of leather objects can be achieved using the method according to the invention, which in contrast to the conventional dyeing methods is exceptional in that use of relatively large amounts of water is avoided in the dyeing process and due to the reduced process time may also use less energy. This is achieved by use of a dyeing agent that is soluble in the pressurized fluid at least when this is in the supercritical state and whereby the dissolved dyeing agent in combination with the pressurized fluid in the supercritical state can penetrate into the leather structure including at least part of the inner structure and perform a colouring of not only the surface of the leather structure but also of the structure below, e.g. collagen fibres in the leather structure.

In accordance with the invention, the step of reducing the pressure in the process chamber, e.g. at the end of the dyeing step in the supercritical state, comprises controlling the pressure reduction over time in such a manner that the leather object maintains desirable characteristics that are vital for its long term use, e.g. preserving the colour and surface characteristics such that any tendency to leather delamination is minimized or even completely avoided and such that leather delamination preventive requirements are met. This may involve setting minimum periods for reducing the pressure, setting maximum numbers for the pressure reduction gradient, setting maximum numbers for a mean pressure reduction gradient or the like, which will ensure that the leather structure and in particular the leather structure that has been dyed by the dyeing agent and been penetrated by the pressurized fluid in the supercritical state, will not be detrimentally affected during the pressure reduction.

The step of reducing the pressure in the process chamber comprises controlling the pressure reduction over time to fulfil leather delamination preventive requirements, e.g. meaning that the leather structure and in particular the leather structure that has been dyed by the dyeing agent and been penetrated by the pressurized fluid in the supercritical state, will not be affected by leather delamination during or after the dying process.

It is noted that the method according to claim 1 states that "a leather object" is being processed, but it will be clear that two or more leather objects may be processed at the same time.

Furthermore, it should be noted that the dyeing agent may be introduced into the process chamber at any convenient stage and in any convenient manner, e.g. into the process chamber prior to the leather object being introduced, at the same time as the leather object being introduced, prior to or together with the pressurized fluid being introduced, when the pressurized fluid has reached the supercritical state, etc.

According to an embodiment of the invention tanning is generally understood as the conversion of a putrescible organic material into a stable material capable of resisting biochemical attack.

In an embodiment of the invention, the step of reducing the pressure in the process chamber comprises removing the pressurized fluid from the process chamber.

Hereby, the pressure reduction may be combined with the process of removing the pressurized fluid from the process chamber, e.g. as a measure in connection with and in advance of the removal of the leather object from the process chamber, which in certain embodiments requires that the pressure of the process chamber essentially be brought down to ambient pressure, e.g. in order to be able to open the process chamber and remove the leather object.

In an embodiment of the invention, the method further comprising the step of removing residue dyeing agent and/or retanning agent from the pressurized fluid during or after the pressurized fluid is removed from the process chamber.

Hereby, any dyeing agent that may not have been absorbed or attached to the leather object, may preferably be removed from the pressurized fluid, e.g. by a distillation, precipitation process or the like, for example in direct connection with the pressure reduction. Superfluous dyeing agent may advantageously be reused and more importantly, the purity of the pressurized fluid can be maintained and reused.

In an embodiment of the invention, the pressurized fluid that is removed from the process chamber is led to a storage container under storage pressure.

Hereby, the pressurized fluid may be stored and prevented from e.g. escaping to the environment.

In an embodiment of the invention, the step of subjecting the leather object in the process chamber to a pressurized fluid comprises utilizing pressurized fluid from the storage container.

Hereby, the pressurized fluid may be stored and later reused, e.g. for a later dyeing cycle, for topping up the amount of pressurized fluid, etc.

In an embodiment of the invention, the step of controlling the pressure in the process chamber of the pressurized fluid to reach a supercritical state comprises increasing the pressure by keeping within predefined limits over time.

Hereby, the pressure is increased over time in such a manner that the leather object maintains desirable characteristics that are vital for its long term use, e.g. preserving the colour and surface characteristics such that any tendency to leather delamination is minimized or even completely avoided and such that leather delamination preventive requirements are met. This may involve setting minimum periods for increasing the pressure, setting maximum values for the pressure increase gradient, setting maximum values for a mean pressure increase gradient or the like, which will ensure that the leather structure and in particular the leather structure that is being dyed by the dyeing agent and will be penetrated by the pressurized fluid in the supercritical state, will not be detrimentally affected during the pressure increase.

The step of increasing the pressure in the process chamber comprises controlling the pressure increase over time to fulfil leather delamination preventive requirements, e.g. meaning that the leather structure will not be affected by leather delamination during or after the dying process.

In an embodiment of the invention, the step of subjecting the leather object to a dyeing agent comprises one of

- introducing the dyeing agent directly to the process chamber,
- introducing the dyeing agent to the pressurized fluid prior to the pressurized fluid being led to the process chamber,
- introducing the dyeing agent in connection with the leather object being introduced to the process chamber, and
- introducing the dyeing agent to the pressurized fluid when the pressurized fluid is controlled to reach or has reached the supercritical state.

In an embodiment of the invention, the step of subjecting the leather object to a retanning agent comprises one of

- introducing the retanning agent directly to the process chamber,
- introducing the retanning agent to the pressurized fluid prior to the pressurized fluid being led to the process chamber,
- introducing the retanning agent in connection with the leather object being introduced to the process chamber, and
- introducing the retanning agent to the pressurized fluid when the pressurized fluid is controlled to reach or has reached the supercritical state.

In an embodiment of the invention, the dyeing agent is any dye relevant for dyeing leather and textile and at least one type of dye selected from the group of acid dyes, basic dyes, direct dyes, reactive dyes, chrome dye, milling dye, premetallized dyes, mordant dyes and sulfur dyes, disperse dyes, reactive disperse dyes and natural based dyes.

An example of a natural based dye may be e.g. rose extract.

In an embodiment of the invention, the dyeing agent is a collagen reactive dyeing agent.

Hereby, the dyeing process may be performed in a particular advantageous manner since for example leather priming, which might be mandatory in connection with traditional leather dying agents, can be avoided. Thus, a simplified process can be achieved. The avoidance of leather priming is achieved by using dyes with affinity to non-primed collagen fibers in the leather and a highly advantage is intensive colors in the leather cross-section as dye anchors to specific available collagen reactive sites.

Examples of reactive dyes may be Levafix Brilliant Blue E-BRA (C.I reactive blue 114 of Dystar Japan Ltd.), Levafix Brill. Red CA (Dystar Japan Ltd.), Levafix Golden Yellow E-G (C.I. reactive yellow 27 of Dystar Japan Ltd.), Eriofast Red B (Huntsman), Novacron Red P-BN GRAN (Huntsman), Lanasol Red 6G (C.I. reactive red 84 of Huntsman).

In an embodiment of the invention the processing agent is a retanning agent.

Hereby, the retanning agent may give the leather fullness with selective filling of the structure and to provide a tight and uniform grain surface for leather finishing.

It should be noted that the present invention may be applied with a special advantage in relation to dye, but that the apparatus and method described herein also may be applied for the processing of leather with retanning agent in general. A retanning or a part of a retanning process may thus be performed e.g. by the application of supplementary tanning agent such as inorganic or organic substances. Inorganic retanning agent which could be applied instead of the above identified dye this include chrome, aluminium, zirconium salts. Organic retanning agents include vegetable tannins, syntans, resins and aldehydes.

In an embodiment of the invention, the amount of dyeing agent and/or retanning agent is dosed in dependence of the weight, thickness and/or the surface area of the leather object.

Hereby, the amount of dyeing agent, e.g. the weight, volume or the like of the dyeing agent can be added to match the leather object, e.g. so that at least the necessary amount and possibly the exact amount is added to achieve the desired dyeing effect and whereby a minimal amount of dyeing agent will be left in the pressurized fluid after the dyeing process.

In an embodiment of the invention, the amount of dyeing agent and/or retanning agent is dosed in dependence of the type of the leather object.

Hereby, the dosing of the dyeing agent, which may be automatic may take into account such parameters as the type of leather, e.g. full grain or top grain leather, embossed grain leather, suede and nubuck as well as the source of the leather. Thus, the amount of residue dyeing agent can be reduced and the dyeing result can in this manner be optimized.

In an embodiment of the invention, the leather object is primed with a primer agent prior to being subjected to the pressurized fluid.

The primer agent may consist of a receptor polymer. The receptor polymer subsequently forms a basis for the intended dyeing as the leather as such is not suitable for dyeing. The priming may be a part of the tanning, retanning and/or finishing process. The dyeing may in principle be performed at any time subsequent to the priming as long as the applied dye matches the primed polymer.

Hereby, it is achieved that a wide range of dyeing agents can be utilized. Furthermore, additional effects can be achieved, e.g. dyeing only certain parts of the leather object, which have been primed and where the corresponding dyeing agent will effect a colouring. Thus, even two-tone colouring, etc., can be performed, possibly in one and the same dyeing process according to the invention. Even dyeing using two or more types of dyeing agents can be performed, one requiring a priming to be performed and one requiring no priming, e.g. a collagen reactive dyeing agent. Other options are possible.

In an embodiment of the invention, the pressurized fluid comprises $CO_2$ having a purity of at least 99.0%, preferably at least 99.9%.

The pressurized fluid comprising $CO_2$ may have a purity of up to 99.99%.

In an embodiment of the invention, the method further comprising the step of dosing the dyeing agent in an automated manner, based on leather object characteristics.

Since the dyeing process is related to leather object or objects that is/are cut specifically to a purpose and with a predefined size, it is possible to dose the essentially exact amount to be used for the dyeing process. Thus, the specific amount of dyeing agent can be introduced e.g. automatically to the pressurized fluid, to the process chamber or to the leather object(s) in connection with the process. It is thereby achieved that the waste of dyeing agent is minimized or even completely avoided. Further, efforts in removing superfluous dyeing agent from the pressurized fluid and/or subsequent cleaning of the process chamber after a dyeing cycle can be minimized.

The leather object characteristics may be the weight and/or the surface area of the leather object, the type of leather, e.g. full grain or top grain leather, embossed grain leather, suede and nubuck as well as the source of the leather. Other characteristics may be relevant as well or instead.

In an embodiment of the invention, the step of subjecting the leather object to a dyeing agent and/or retanning agent, which dyeing agent or retanning agent is dissolved and/or transported in the pressurized fluid for at least a predefined period of time while the pressurized fluid is in the supercritical state, further comprises mixing, stirring or circulation of the pressurized fluid in the supercritical state.

Other retanning and/or dyeing agent may also be carried or transported by the pressurized fluid. In other words, the retanning and/or dyeing agent must not necessarily be dissolved in the pressurized fluid as long as a resulting dyeing and/or retanning is obtained. Retanning and/or dyeing agent may be carried and/or transported by the pressurized fluid e.g. due to the flowrate of the pressurized fluid in the supercritical state.

In an embodiment of the invention, the dyeing step includes the use of color-fixing agents.

In an embodiment of the invention, the method comprises fatliquoring.

The fatliquoring process may be made simultaneously to dyeing but may also as an independent process. Vegetable, animal or synthetic oils, fats and waxes may be used.

Examples of fatliquoring agents may be fatliquoring agents may be used, including anionic fatliquors such as sulfonated fatliquors and sulfited oils, soap fatliquors and cationic fatliquors. Nonionic fatliquors may also be used, including alkyl ethylene oxide condensates and protein emulsifiers. Multicharged fatliquors that are formulations of non-ionic, anionic and cationic fatliquors, may also be used for the fatliquoring process.

In an embodiment of the invention, the method comprises re-tanning agents.

Tanning as a primary tanning may not be sufficient to maintain the desired characteristics and the leather may therefore be re-tanned.

Retanning agents can be inorganic mineral substances (chrome, aluminium, zirconium, titanium, iron salts or combinations thereof) or organic substances (aldhehydes, vegetable tannins and syntans, resins, oils).

The re-tanning process may be made simultaneously to dyeing and/or fatliquoring but may also as an independent process.

In an embodiment of the invention, the pressure of the pressure of the pressurized fluid in the supercritical state is at least 70 bar, such as between 70 to 260 bar, such as 90 to 150 bar, such as 130 to 250 bar, or such as 180 to 240 bar.

In an embodiment of the invention, the temperature of the pressurized fluid in the supercritical state is between 30 to 120 degrees Celsius, such as between 30 to 100 degrees Celsius, such as between 30 to 60 degrees Celsius, such as between 30 degrees Celsius to 50 degrees Celsius, such as between 30 degrees Celsius to 40 degrees Celsius.

In an embodiment of the invention, the predetermined time during which the leather object is subjected to the dyeing agent and/or the retanning agent in the pressurized fluid in the supercritical state, is at least 1 min., such as at least 15 min., such as between 15 min. and 4 hours, such as between 25 min. and 2 hours, such as in excess of 35 min.

In an embodiment of the invention, the predetermined time during which the leather object is subjected to the dyeing agent and/or the retanning agent in the pressurized fluid in the supercritical state, is at least 1 min., such as at least 15 min., such as between 1 min. and 40 minutes, such as between 1 min. and 4 hours, such as between 5 min. and 2 hours, such as in excess of 15 min and such as below 1 hour.

The predetermined time during which the leather object is subjected to dyeing agent and/or the retanning agent in the pressurized fluid in the supercritical state, may also be between 40 min. to 4 hours, such as between 45 min. and 2 hours, such as between 55 min. and 2 hours, such as between 1 hour and 2 hours, such as in excess of 40 min.

In an embodiment of the invention, the method further comprising the step of providing a leather material, which leather material has been processed by at least a tanning process, whereby the at least one leather object is cut from the leather material prior to being provided and introduced into the process chamber.

The leather material, which leather material has been processed by at least a tanning process, may for example be a hide or skin from a whole animal, which hide or skin has been subjected to the usual initial hide or skin processes including a tanning process and which is ready for the dyeing process. According to this embodiment the hide or skin is now cut by cutting one or more leather parts out of the hide or skin. These leather objects may be destined for different purposes, e.g. different parts of a shoe, and may for example furthermore be desired to be differently dyed. By this embodiment one or more leather objects may now be introduced into the process chamber for being dyed in accordance with the invention. Hereby, it is avoided that e.g. a whole hide or skin is being dyed, as is the case according to the long-known techniques used within the field, which may cause that part of the whole dyed hide or skin is being discarded according to the prior art. Hence, by this embodiment the waste of leather material can be reduced, and the consumption of e.g. dyeing agents can be reduced, thereby leading to a higher degree of cost-efficiency and a reduction in environmental impact. Further, the individual leather objects can be processed specifically in view of the particular characteristics of the leather objects, e.g. objects from top hide parts can be dyed using the precise amount of dyeing agent and in order to achieve the desired colouring in view of e.g. the leather characteristic and the intended use, and leather parts stemming from other parts, e.g. belly parts, of the hide can correspondingly be processed and dyed with a precise amount of dyeing agent in a manner, which match their specific origin and intended use.

In an embodiment of the invention, the pressure of the pressurized fluid in the supercritical state and/or the temperature of the pressurized fluid in the supercritical state are/is controlled to provide the density of the pressurized fluid in the supercritical state being in a predefined range.

In an embodiment of the invention, the pressure reduction is controlled over time such that the reduction period exceeds 5 min, such as a time interval of between 5 min. to 2 hours, such as 15 min. to 45 min., such as 15 min. to 30 min, such as 30 min. to 2 hours, such as 30 min. to 65 min.

In an embodiment of the invention, the pressure reduction is controlled over time such that the reduction of pressure does not exceed a predefined leather pressure reduction gradient such as 10 bar/min, such as 8 bar/min, such as 6 bar/min or such as 4 bar/min.

In an embodiment of the invention, the pressure of the pressurized fluid is controlled to reach a supercritical state such that the time period exceeds a predefined increase period of 5 min, such as an interval between 5 min. to 1 hour, such as 15 min. to 45 min., such as 15 min. to 30 min.

In an embodiment of the invention, the pressurizing of the pressurized fluid in the process chamber to reach a supercritical state comprises that the increase of pressure does not exceed a predefined leather pressure increase gradient such as 20 bar/min, such as 15 bar/min, such as 10 bar/min, such as 8 bar/min, such as 6 bar/min, such as 5 bar/min or such as 4 bar/min.

The disclosure further relates to an apparatus for dyeing of leather objects, said apparatus comprising:

a process chamber, a source of pressurized fluid, a source of dyeing and/or retanning agent, a pump for example a controllable compressor for increasing the pressure of the pressurized fluid to reach a supercritical state, a pressure reducer for example a pressure reducing member for reducing the pressure in the process chamber and a controller, wherein the controller is configured for controlling the pressure reducer to reduce the pressure in the process chamber over time subsequent to a leather object having been subjected to the dyeing agent dissolved in the pressurized fluid in the supercritical state for at least the predetermined period of time.

Hereby, the dyeing of leather objects can be achieved using the apparatus according to the invention, which in contrast to the conventional dyeing methods is exceptional in that use of relatively large amounts of water is avoided. This is achieved by use of a dyeing agent that is soluble in the pressurized fluid at least when this is in the supercritical state and whereby the dissolved dyeing agent in combination with the pressurized fluid in the supercritical state can penetrate into the leather structure including at least part of the inner structure and perform a colouring of not only the surface of the leather structure but also in the structure below, e.g. collagen fibres in the leather structure.

In accordance with the invention, the controller is configured for reducing the pressure in the process chamber, e.g. at the end of the dyeing process in the supercritical state, such that the pressure is reduced over time in such a manner that the leather object maintains desirable characteristics that are vital for its long term use, e.g. preserving the colour and surface characteristics such that any tendency to leather delamination is minimized or even completely avoided and such that leather delamination preventive requirements are met. This may involve setting minimum periods for reducing the pressure, setting maximum numbers for the pressure reduction gradient, setting maximum numbers for a mean pressure reduction gradient or the like, which will ensure that the leather structure and in particular the leather structure that has been dyed by the dyeing agent and been penetrated by the pressurized fluid in the supercritical state, will not be detrimentally affected during the pressure reduction.

The controller is configured to reduce the pressure in the process chamber by controlling the pressure reduction over time to fulfil leather delamination preventive requirements, e.g. meaning that the leather structure and in particular the leather structure that has been dyed by the dyeing agent and been penetrated by the pressurized fluid in the supercritical state, will not be affected by leather delamination during or after the dyeing process.

In an embodiment of the invention, the controller further is configured for controlling the pressure in the process chamber of the pressurized fluid to reach a supercritical state by increasing the pressure within predefined limits over time.

In should be noted that a controller is referring to a control arrangement of one or more interacting electrical circuits which may be pre-configured or to be configured to execute a certain desired method, e.g. the methods claimed and described in the present invention, e.g. in the disclosed apparatus. The controller may thus include RAM or ROM memory.

Thus, the method of dyeing and/or retanning of leather may be applied with various degrees of automation, including in an essentially fully automated manner, e.g. for example comprising an automation, partially or fully of one or more of the steps of providing a leather object, which leather object has been processed by at least a tanning process, introducing the leather object into a process chamber, subjecting the leather object in the process chamber to a pressurized fluid, controlling the pressure of the pressurized fluid to reach a supercritical state, subjecting the leather object to a dyeing agent, which dyeing agent is dissolved in or carried/transported by the pressurized fluid for at least a predefined period of time while the pressurized fluid is in the supercritical state, and/or subjecting the leather object to a retanning agent while the leather object is in the pressurized fluid in the supercritical state reducing the pressure in the process chamber, removing the leather object from the process chamber, wherein the step of reducing the pressure in the process chamber comprises controlling the pressure reduction over time.

According to further embodiments, the method may be applied in an at least partially automated manner by incorporating automation of steps and/or features as exemplified in the dependent claims.

Hereby, the pressure is increased over time in such a manner that the leather object maintains desirable characteristics that are vital for its long term use, e.g. preserving the colour and surface characteristics such that any tendency to leather delamination is minimized or even completely avoided and such that leather delamination preventive requirements are met. This may involve setting minimum periods for increasing the pressure, setting maximum values for the pressure increase gradient, setting maximum values for a mean pressure increase gradient or the like, which will ensure that the leather structure and in particular the leather structure that is being dyed by the dyeing agent and will be penetrated by the pressurized fluid in the supercritical state, will not be detrimentally affected during the pressure increase.

The increase of pressure in the process chamber comprises controlling the pressure increase over time to fulfil leather delamination preventive requirements, e.g. meaning that the leather structure will not be affected by leather delamination during or after the dyeing process.

THE FIGURES

Figure 3:
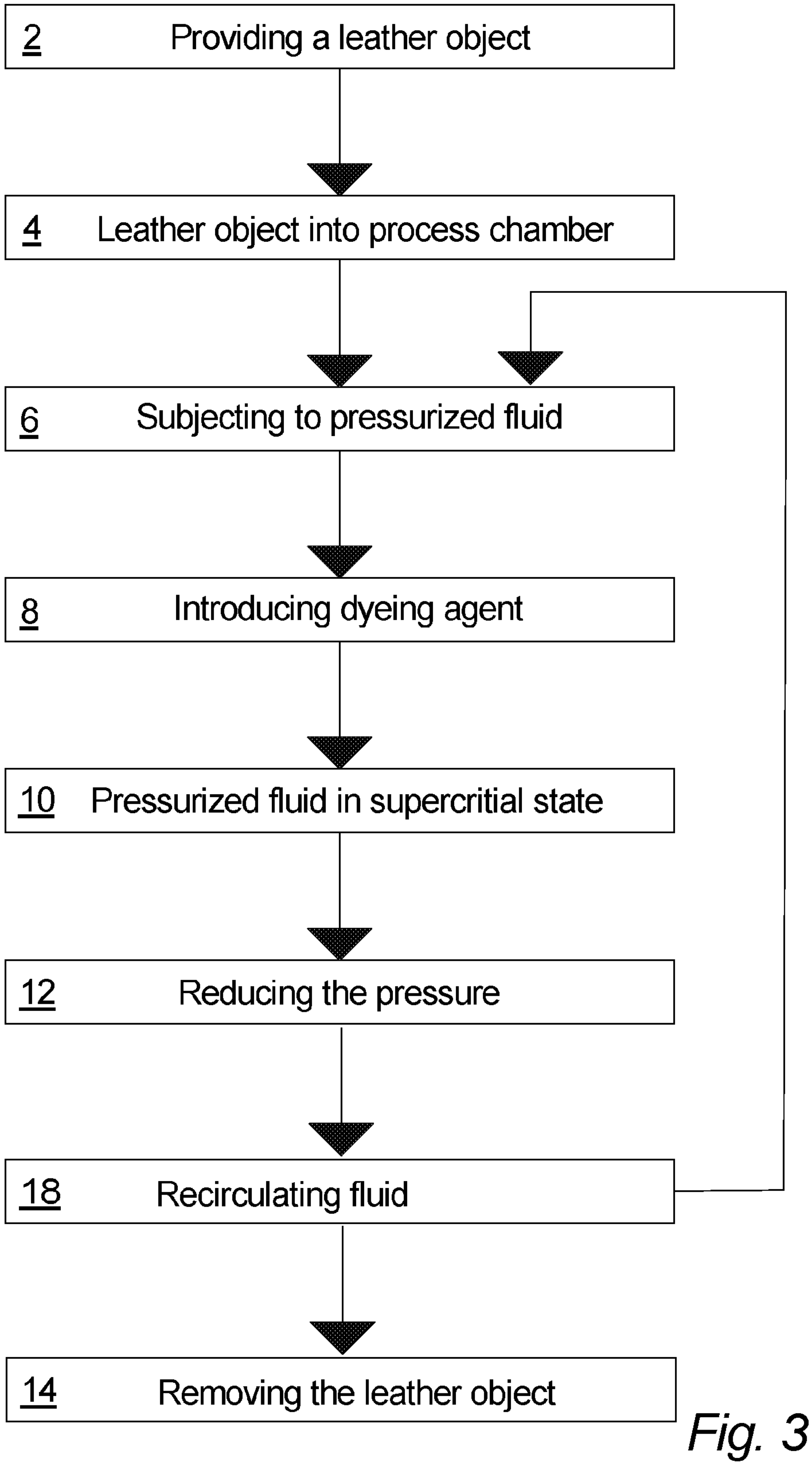
Figure 4:
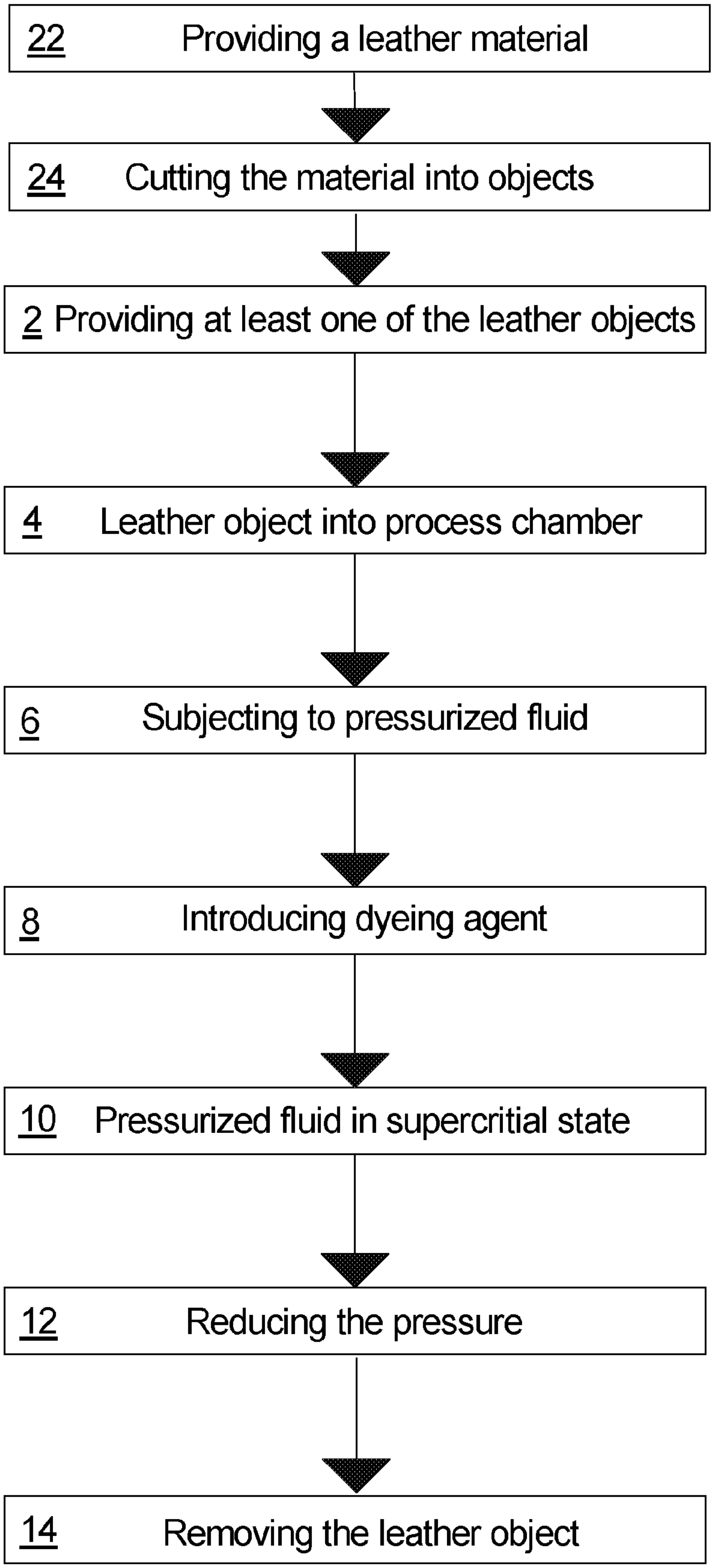
Figure 5A:
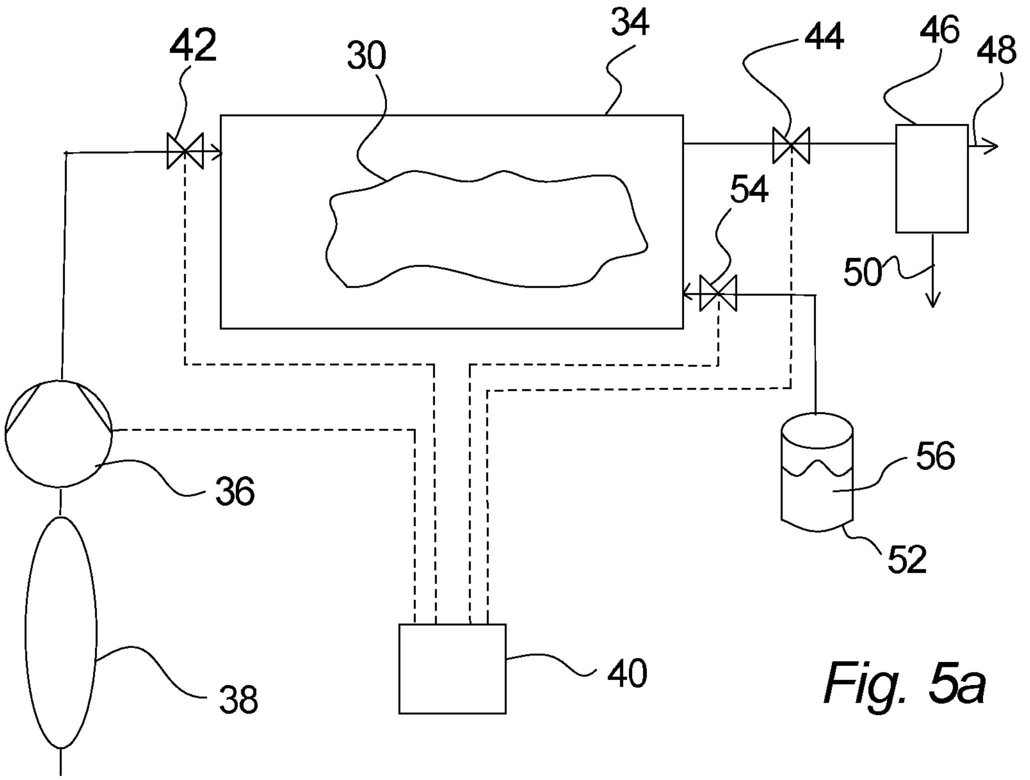
Figure 5B:
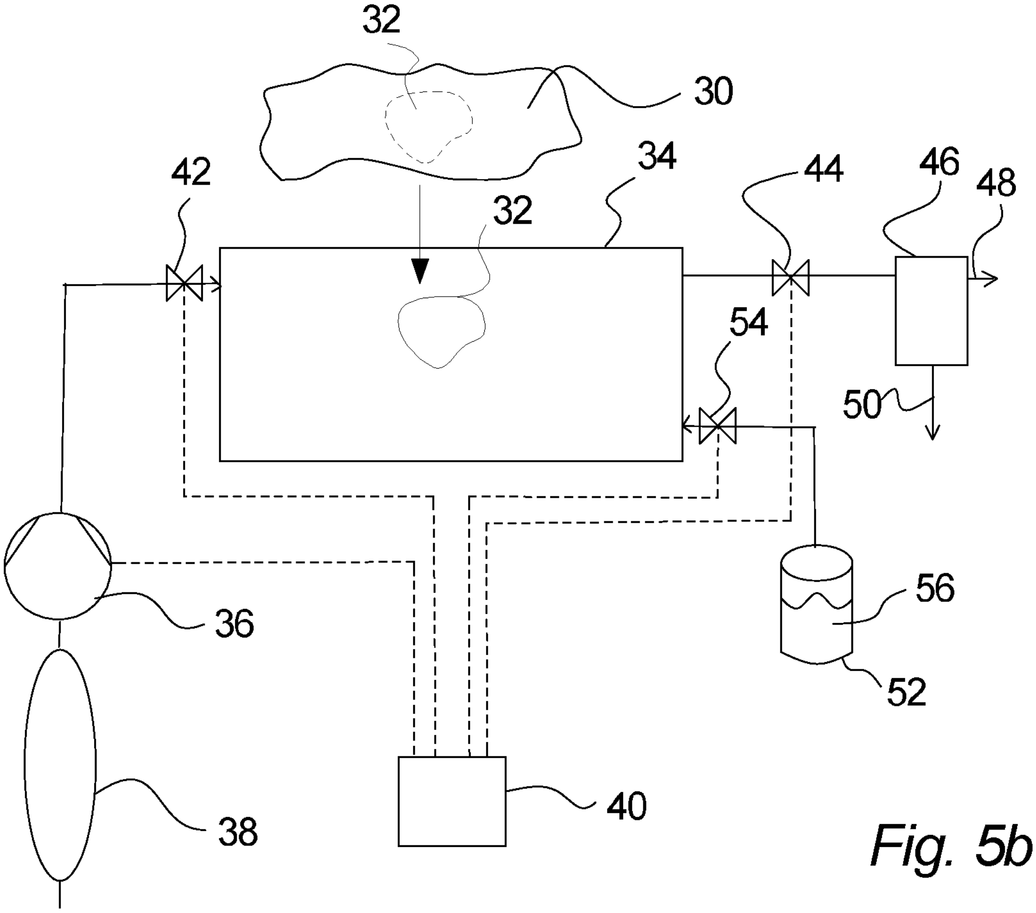
Figure 6A:
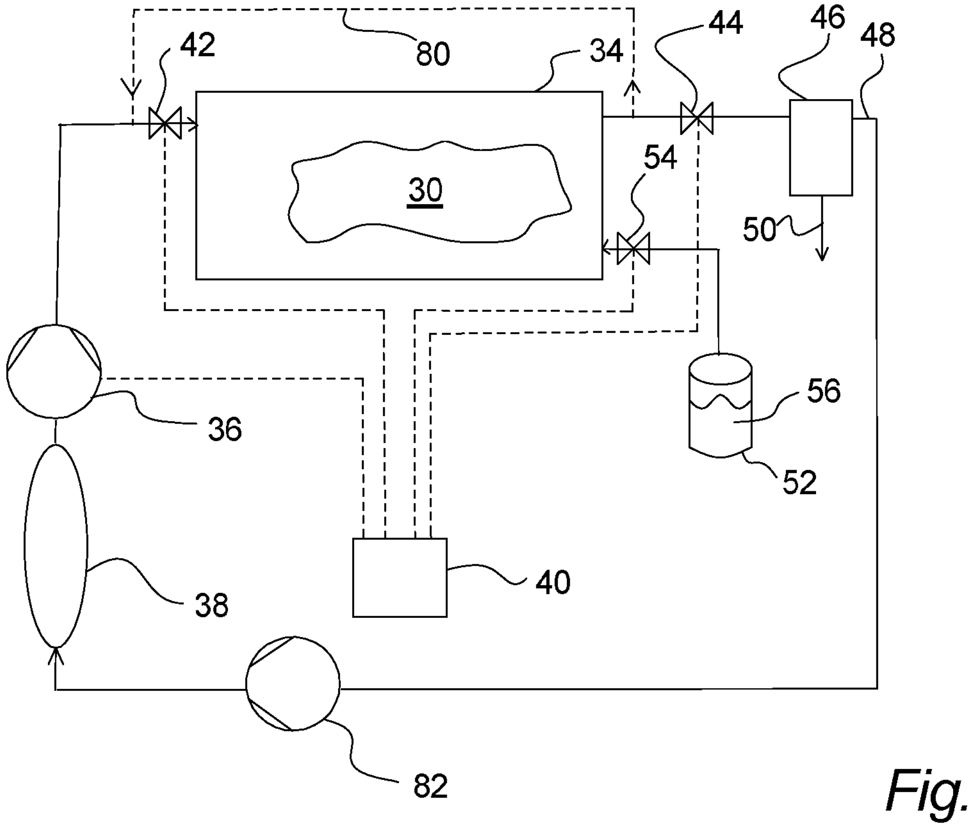
Figure 6B:
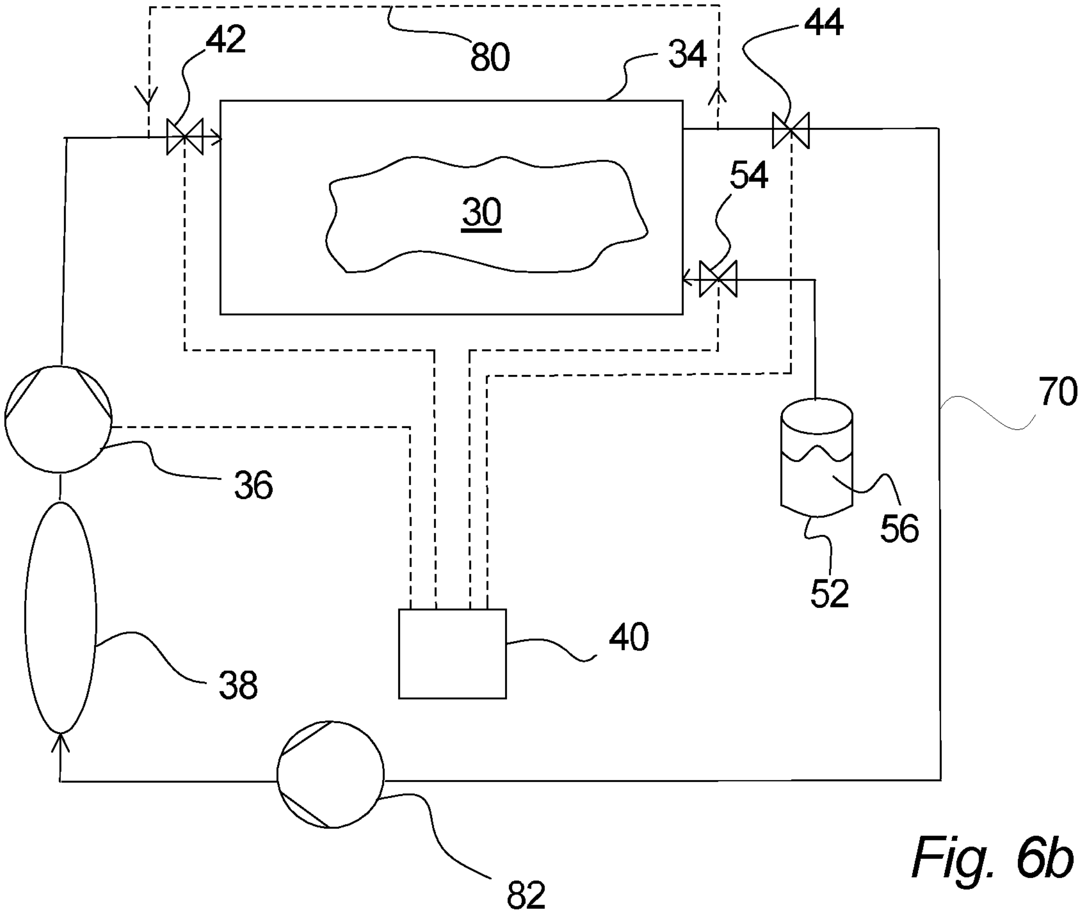
Figure 7:
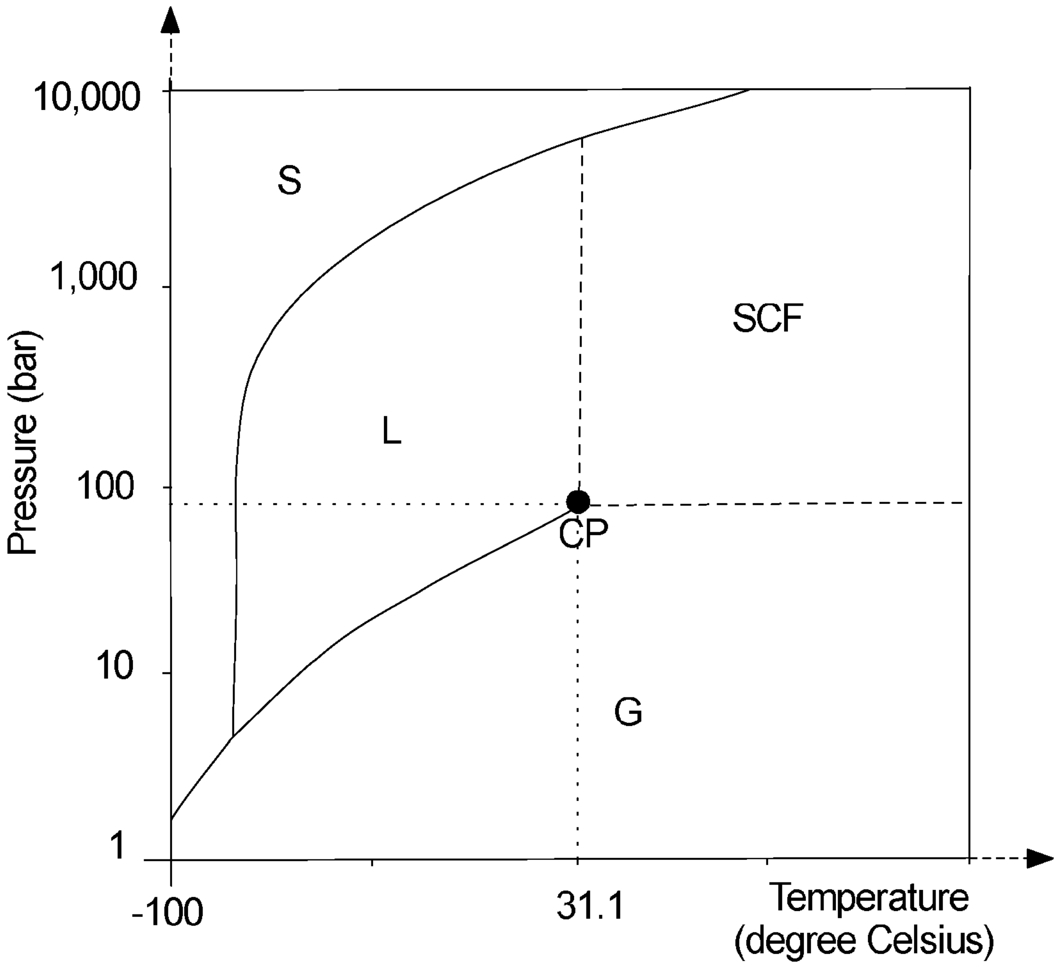
Figure 8A:
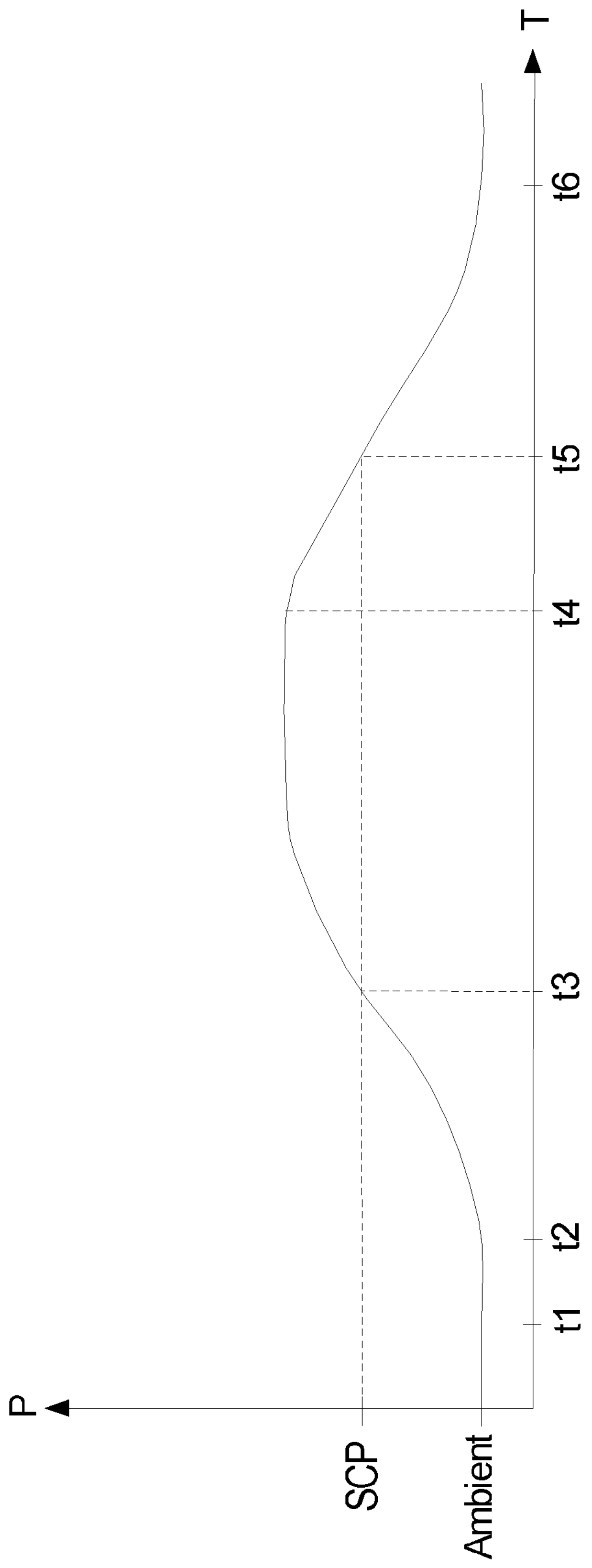
Figure 8B:
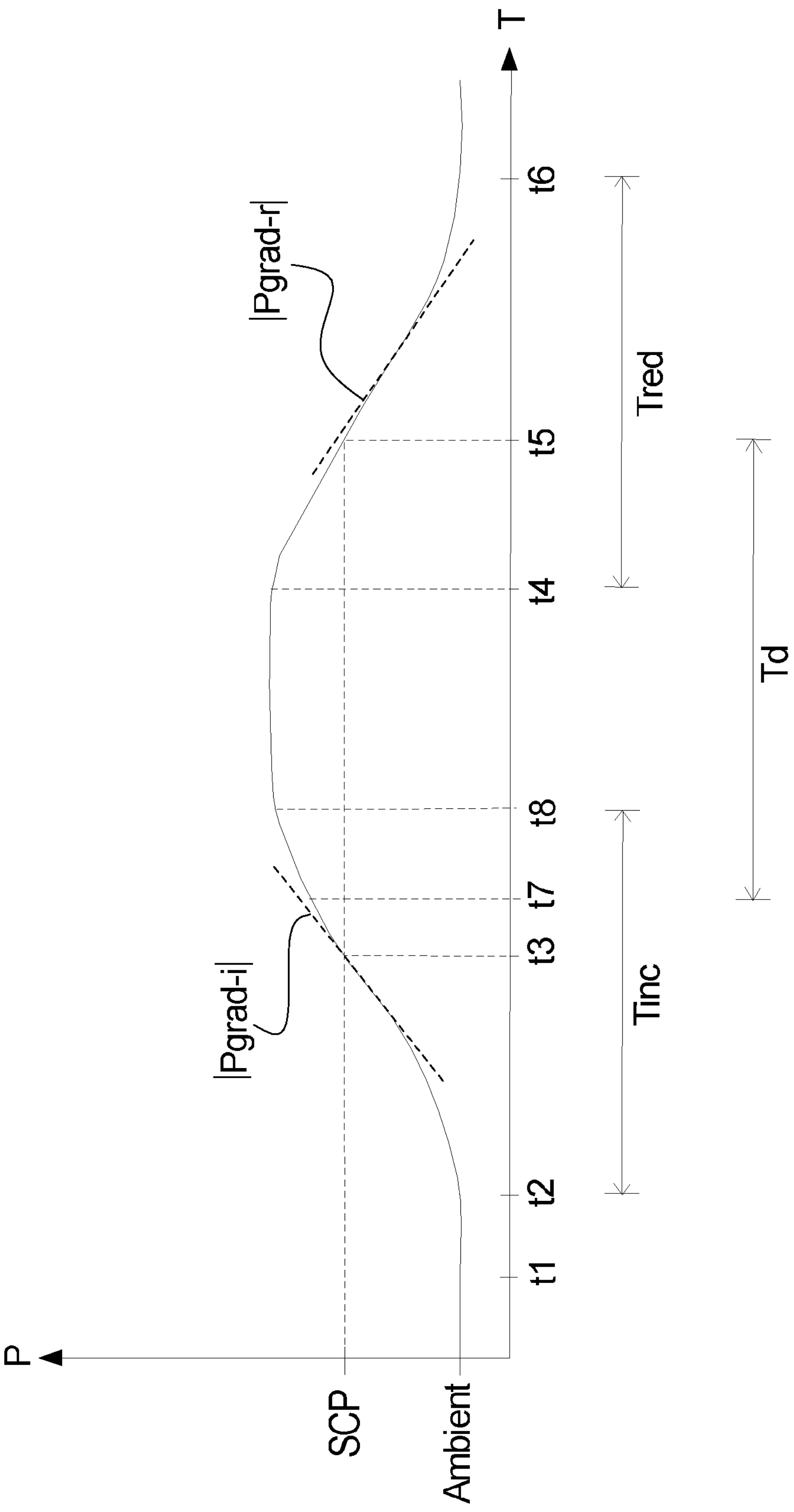

The invention will be described in the following with reference to the drawings, where FIG. 1-4 illustrates examples of processing leather objects by dyeing and/or retanning according to embodiments of the invention, FIGS. 5*a* and 5*b* illustrates an example of an apparatus for dyeing and/or retanning according to embodiments of the invention, FIGS. 6*a* and 6*b* illustrates examples of an apparatus for dyeing and/or retanning according to embodiments of the invention, FIG. 7 illustrates a phase diagram for carbon dioxide and FIGS. 8*a* and 8*b* illustrates an example of a graph of pressure over time.

DETAILED DESCRIPTION

FIG. 1 illustrates components throughout a process flow. Initially a leather object is provided 2, either as a piece of leather that has not been cut or trimmed in advance or the leather object may be at least one pre-cut piece of leather. The leather object is placed into a process chamber 4 and subjected to pressurized fluid 6. Dyeing agent is introduced 8 and supercritical state is reached 10, e.g. by pumping, compressing the fluid further, etc. Lastly, after the dyeing process has been performed, the pressure is reduced 12 and the leather object is removed 14.

Figure 2:
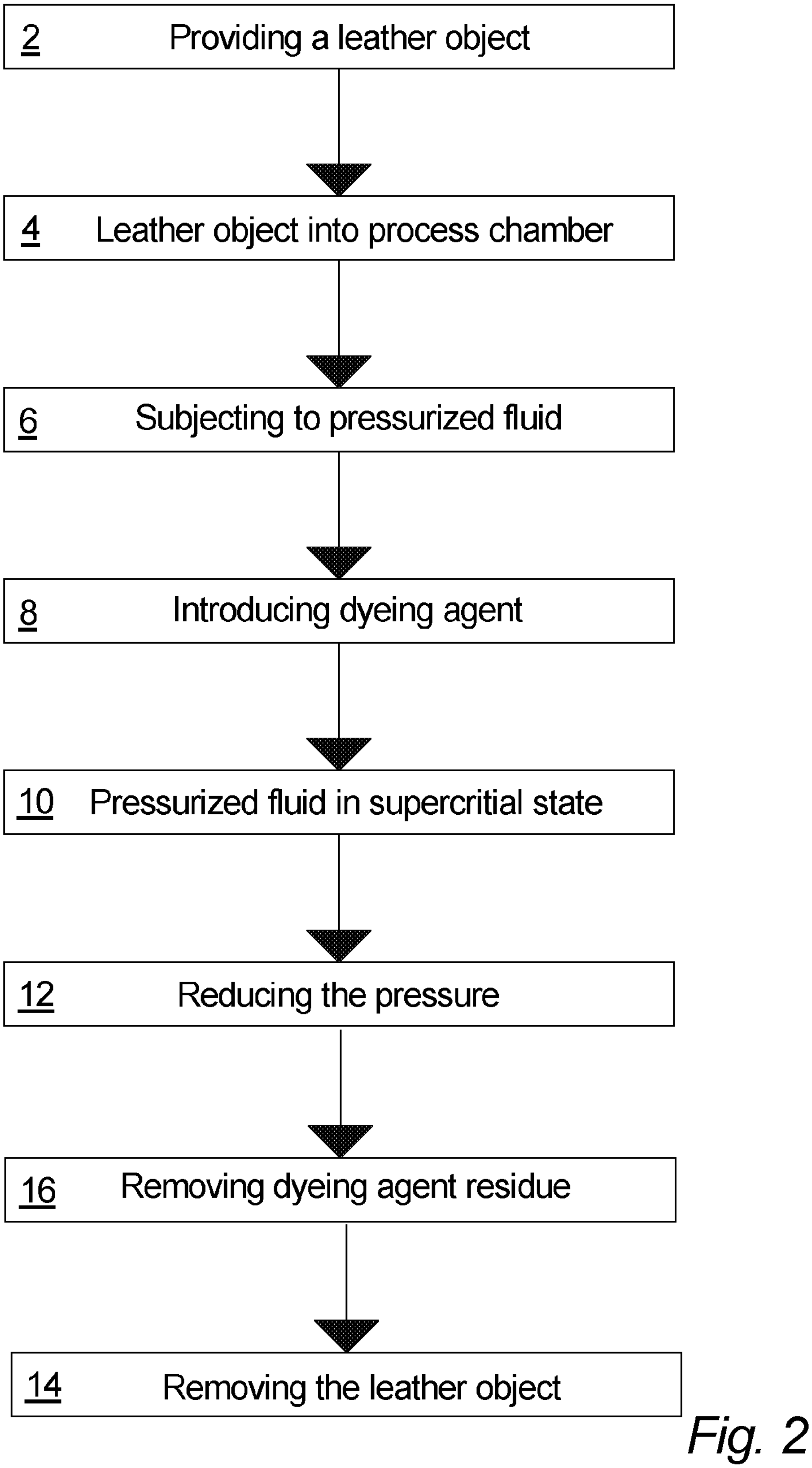

FIG. 2 also illustrates components throughout a process flow. Initially a leather object is provided 2, either as a piece of leather that has not been cut or trimmed in advance or the leather object may be at least one pre-cut piece of leather. The leather object is placed into a process chamber 4 and subjected to pressurized fluid 6. Dyeing agent is introduced 8 and supercritical state is reached 10. Lastly, the pressure is reduced 12, dyeing agent residues are removed 16, e.g. via a process such as distillation, precipitation, etc. for example in connection with the reduction of the pressure, and the leather object is removed 14.

FIG. 3 further illustrates components throughout a process flow. Initially a leather object is provided 2, either as a piece of leather that has not been cut or trimmed in advance or the leather object may be at least one pre-cut piece of leather. The leather object is placed into a process chamber 4 and subjected to pressurized fluid 6. Dyeing agent is introduced 8 and supercritical state is reached 10. Lastly, the pressure is reduced 12, the fluid is recirculated 18, e.g. to a container, from which it can be supplied for subsequent use as indicated in the flow sheet, and the leather object is removed 14.

FIG. 4 illustrates components throughout a process flow. Initially a leather material is provided 22 and the leather material is cut into objects 24. At least one of the leather objects is placed into a process chamber 4 and subjected to pressurized fluid 6. Dyeing agent is introduced 8 and supercritical state is reached 10. Lastly, the pressure is reduced 12 and the leather object is removed 14.

Now referring to the figures FIG. 1 to FIG. 4, illustrating process flows according to embodiments of the invention, the process chamber wherein the leather object or leather objects are placed is here exemplified as a box. It should however be noted that the process chamber can have any form relevant for mediating the optimal conditions to maintain supercritical conditions over a time. In embodiments of the invention the process chamber and apparatus may in some relations appear in small scales and in other relations in big scales depending on the given applications.

The pressurized fluid may be in liquid form but may also be in gas form.

It is noted that a retanning agent may be introduced instead of a dyeing agent in the examples illustrated in FIGS. 1-4.

FIGS. 5*a* and 5*b* illustrate examples of an apparatus in an embodiment of the invention, e.g. using a method according to an embodiment of the invention.

FIG. 5*a* illustrates the processing of a leather material 30 that may be a whole piece of leather without any pre-cutting or may be a piece of leather, e.g. a leather object that has been through a step of cutting or trimming.

FIG. 5*b* illustrates the processing of a leather material 30, where the leather piece has been through at least one process of cutting the leather into at least one smaller piece, e.g. a leather object 32 prior to entering the process chamber.

In FIGS. 5*a* and 5*b*, a leather object, as a piece that has not been pre-cut 30 or as a pre-cut piece of leather 32, is subjected to a process chamber 34. The process chamber may be configured in the form of a pressure chamber.

The pressure chamber may be in connection to at least one controllable compressor 36 for pressurizing a fluid, which is supplied from a high pressure storage container 38. The pressure provided by the controllable compressor 36 is introduced to the pressure chamber 34 by an introducing member 42, e.g. a controllable valve or the like. At an output end the pressure can be reduced by a pressure reducing member 44, e.g. in the form of a controllable valve or the like. The apparatus according to an embodiment of the invention, may also comprise a separator 46, which receives the escaping pressurized fluid and where for example residue dyeing agent may be separated from the pressurized fluid. The pressurized fluid can leave the separator 46 via an outlet 48 and the separated residue dyeing agent may be collected via a residue outlet 50. The outlet 48 may lead to further processing, for storing in a storage container or the like. A processing agent 56 is introduced from the source of processing agent 52 into the process chamber via a controllable inlet 54 and in a preferred embodiment of the invention, the processing agent is a dye.

Dye may be introduced to the process chamber at the same time as the leather object but may also already be in the chamber or introduced after the leather object is subjected to the chamber.

The pressure is introduced in such way that a supercritical condition is reached, and optimal dyeing conditions are achieved in such way that the dye is dissolved and optimally binds to the leather. The pressure is released in such a manner that the leather object maintains desirable characteristics that are vital for its long-term use, e.g. preserving the colour and surface characteristics such that any tendency to leather delamination is minimized or even completely avoided and such that leather delamination preventive requirements are met. The introduction and release of pressure and introduction of dye are controlled by a controller 40, where the controller 40 as illustrated may be connected to the controllable compressor 36, the introducing member 42, the controllable inlet 54 and the pressure reducing member 44 to control these in dependence on such parameters as time, pressure, temperature, characteristics of the leather object, etc.

The pressurized fluid may be in liquid form but may also be in gas form.

FIGS. 6*a* and 6*b* further illustrates an example of an apparatus in an embodiment of the invention. Features illustrated in FIGS. 6*a* and 6*b* and which corresponds to features as illustrated in FIGS. 5*a* and 5*b* are designated with the same reference numbers. A leather object 30 is subjected to a process chamber 34, wherein the process chamber may be configured in the form of a pressure chamber. The leather object may be a whole leather piece that has not been pre-cut or trimmed prior to the process but may also be at least one pre-cut leather piece. The apparatus as shown in FIG. 6*b* corresponds essentially to the example shown in FIG. 6*a*, but the modification that will be explained in the following can be implemented in any other of the embodiments that are described herein. The pressurized fluid may after the dyeing process, where the supercritical fluid with the dye has been circulated via the recirculation connection 80, leave the process chamber via the separator 46. However, as indicated in FIG. 6*b*, the separator has been omitted and the separation of surplus dye can instead be performed within the process chamber 34, e.g. by reducing the pressure of the fluid, whereby any residue or surplus dye will be separated from the fluid and eventually fall to the bottom of the process chamber. When the surplus dye has been separated, the fluid, e.g. CO2, can be e.g. pumped from the process chamber 34 via the reducing member 44, via the recirculation connection 70 and the recirculation compressor 82, Hereby, the fluid will be led back into the storage container 38. As regards the residue dye in the process chamber 34, this can be collected, and/or a rinsing cycle can be made with e.g. CO2 in order to clean the process chamber and its connections.

The pressurized fluid may be circulated and reused from the pressurized chamber back in the pressurized chamber as illustrated with the recirculation connection 80. The pressurized fluid may also or as a single process step be circulated and reused after leaving the separator 46 and via a recirculation compressor 82 lead back into the high pressure storage container 38.

FIG. 7 illustrates a scale phase diagram for carbon dioxide (schematic and not to scale). Carbon dioxide behaves as a gas G in air at standard temperature and pressure or as solid S when frozen. When the temperature and pressure both are increased to be above the critical point CP for carbon dioxide, it adopts properties midway between gas and a liquid. Here, it behaves as a supercritical fluid SCF above its critical temperature (31.1° C.) and critical pressure (73.9 bar).

FIG. 8*a* illustrates an exemplified timeline of the pressure P over time T, e.g. illustrating the condition in the process chamber 34 during a leather object dyeing cycle. The pressure may start at ambient pressure t1 and at this point a leather object may be introduced into the process chamber. After a given time, the pressure is increased t2, e.g. by introducing and further pressurizing a pressurized fluid such as CO2 and increases until a critical point of pressure CP t3. The gradient of the increase of pressure over time may be a steep increase wherein the pressure is increased over a shorter period of time or the increase may also be slower wherein the pressure is increased slower over a given time. Between t3 and t5 supercritical conditions are kept over a given time. The illustrated curve is in this example showed with a flat top with a constant pressure over time, however, the top could also have a pressure increase overtime extending directly into a decrease without having a constant pressure over time. After a given period of time t4 the pressure is decreased and decreases over time until ambient conditions are reached. The gradient of the decrease of pressure over time may be a steep decrease wherein the pressure is decreased over a shorter period of time or the decrease may also be slower wherein the pressure is decreased slower over a given time.

Dye may be added to the process chamber in the beginning of the process e.g. at t1 or t2 but may also be added later maybe during the supercritical conditions. Possible excess dye may be released and removed from the process chamber (or separated from the pressurized fluid leaving the process chamber) when the pressure decreases or when conditions have reached ambient conditions.

FIG. 8*b* illustrates a corresponding exemplified timeline of the pressure P over time T, wherein the essentially same pressure curve and the same points of time are shown as in FIG. 8*a*. Furthermore, it is illustrated as an example in FIG. 8*b* that dye is added to the process chamber at the time t7, i.e. after the liquid has reached the supercritical state. Consequently, as shown below the time axis (T-axis), the leather objects in the process chamber will be subjected to dyeing agent dissolved or diluted in the supercritical fluid for a period Td corresponding to t5-t7.

Further, it is illustrated in FIG. 8*b* that the pressure reaches a maximum value at t8, where after the pressure remains essentially constant until t4. Thus, as shown below the time axis (T-axis), the leather objects in the fluid will be subjected to a pressure increase for a period Tinc corresponding to t8-t2. Also, it is shown that the pressure gradient may be determined and monitored, here indicated as the numerical value IPgrad-iI. The apparatus may be configured to control the pressure increase by monitoring the period Tinc, which must exceed a predefined increase period such as e.g. 15 min. such as e.g. 25 min., such as e.g. 30 min., such as between 5 min. to 1 hour, such as 15 min. to 45 min., such as 15 min. to 30 min. or the apparatus may be configured to control the pressure increase by monitoring the pressure gradient, e.g. the numerical value IPgrad-iI. which must not exceed a predefined leather pressure increase gradient such as e.g. 20 bar/min, such as 15 bar/min, 10 bar/min, such as 8 bar/min, such as 6 bar/min, such as 5 bar/min or such as 4 bar/min.

Even further, it is illustrated in FIG. 8*b* below the time axis (T-axis), the leather objects in the fluid will be subjected to a pressure reduction for a period Tred corresponding to t6-t4. Also, it is shown that the pressure gradient may be determined and monitored, here indicated as the numerical value IPgrad-rI. The apparatus may be configured to control the pressure reduction by monitoring the period Tred, which must exceed a predefined reduction period such as e.g. 15 min. such as e.g. 25 min., such as e.g. 30 min. such as between 5 min. to 2 hours, such as 15 min. to 45 min., such as 15 min. to 30 min, such as 30 min. to 2 hours, such as 30 min. to 65 min. or the apparatus may be configured to control the pressure reduction by monitoring the pressure gradient, e.g. the numerical value IPgrad-rI. which must not exceed a predefined leather pressure reduction gradient such as e.g. 10 bar/min, such as 8 bar/min, such as 6 bar/min or such as 4 bar/min.

The diagram is schematic and time intervals for pressurization and reduction may vary from each other, even considerably, and that pressurization may be much faster than depressurization, thus meaning that the curve may be relatively steeper for the pressurization In the present context, pressurized fluid and fluid represents a compound that adopts properties midway between gas and a liquid and behaves as a supercritical fluid.

Any substance is characterized by a critical point which is obtained at specific conditions of pressure and temperature. When a compound is subjected to a pressure and a temperature higher than its critical point, the fluid is said to be "supercritical".

Carbon dioxide is the most widely used supercritical fluid because it is a naturally occurring gas and readily available for industrial consumption.

Carbon dioxide usually behaves as a gas in air at standard temperature and pressure or as solid when frozen (dry ice). When the temperature and pressure both are increased to be above the critical point CP for carbon dioxide, it adopts properties midway between gas and a liquid. Here, it behaves as a supercritical fluid above its critical temperature (31.1° C.) and critical pressure (73.9 bar). In this way supercritical carbon dioxide has liquid-like densities, which is advantageous for dissolving dyes, and gas-like low viscosities and diffusion properties, which can lead to shorter dyeing times compared to water and dye penetration into a material.

The critical point of the pressurized fluid may vary according to various conditions such as e.g. the density and/or purity of the fluid. The method for dyeing leather objects may therefore not only be possible in a supercritical state but also in near-supercritical state. Supercritical state and near supercritical may be used interchangeably in the present context. Thus, it should be understood that when in the claims and description of the present application reference is made to "pressurized fluid in the supercritical state" or similar terms, such terms will include a pressurized fluid that is in a near-supercritical state.

The term "super critical carbon dioxide" or "SC-CO2" may be used interchangeably in the present context. Also, carbon dioxide and $CO_2$ may be used interchangeably in the present context.

The term "dye" or the term "dyeing" is in the present context referring to dyeing substances other that chromium-based compounds as typically used within the art as tanning agents, although it is noted that e.g. chromium-based substances during conventional tanning typically results in a bluish coloring of the tanned leather. In the present context, dye or dyeing thus refer to substances added with the purpose of obtaining a desired colour. In other words, such a dyeing within the scope of the invention would preferably be performed at supercritical carbon dioxide conditions.

The inventive process of dyeing may be processed in a process chamber but generally, it should be noted that the dyeing process may be applied with any suitable dyeing equipment designed to dye according to the provisions of the invention.

The term leather or leather material refers to the skin of an animal prepared for use by tanning or a similar process designed to preserve it against decay and make it pliable or supple when dry.

Leather types that may be used within the scope of the invention may be any bovine derived type such as cow or calf. Examples of leather types that may be used within the scope of the invention may be types such as full grain or top grain leather, embossed grain leather, suede and nubuck.

In principle, the leather can derive from any source, including horse hide, goat skin, sheep skin, kangaroo hide and the like. Even so, preferably the leather is a mammal or marsupial leather (i.e. derives from a hide from a mammal such as a cow or horse, or a marsupial such as a kangaroo). Bovine leathers are most often used.

The term leather object refers to any piece of leather that may be used as either a whole piece or a pre-cut piece of leather. Leather in this context is broadly understood as objects containing leather parts. In other words, the leather object must contain animal skin parts which has been prepared for use by tanning or a similar process designed to preserve it against decay.

A leather object may also include e.g. yarn or filament.

Leather objects may be pre-cut parts for e.g. a shoe, where such parts could e.g. be a vamp, toe cap, tongue, quarter or a heel cap.

Leather object may of course also refer to other types of leather, including clothing, clothing parts, leather accessories such as bag, leather parts of a bag, wrist straps, mobile phone covers, etc. Leather objects may also include leather parts related to automotive, e.g. leather objects for seats, leather objects for steering wheel covers, gear knob covers, etc.

Leather objects may also refer to objects containing leather parts, such as filament or yarn reconstructed from leather e.g. as disclosed in PCT/EP2018/053849, PCT/EP2018/053848, hereby included by reference. Such yarn or filament is thus understood as a leather object within the scope of the invention, as long as the small leather parts, also referred to as fibrils in the above-mentioned applications, originate from tanned leather, even if the leather object in such a case also includes an additive promoting the gathering of such small leather parts.

It should be noted that "a leather object" being processed within the scope of the invention, may mean that one, two or more leather objects may be processed at the same time.

Preferably the leather type is carefully selected based on its properties and chemicals used e.g. in pre-treatment of the leather e.g. during the tanning process.

In principle, the method may be carried out with any type of leather. However typically, the leather has already been tanned.

Tanning is used as the conventional ways of treating leather and may be applied to the invention. Depending on the compounds, the color and texture of the fabric may change. The technical definition of tanning is well known in the art, but briefly, according to Anthony D. Covington "Tanning Chemistry" chapter 10, the only strict definition of tanning is the conversion of a putrescible organic material into a stable material capable of resisting biochemical attack. Tanning involves a number of steps and reactions depending on the initial material and the final product.

In the case of collagen, it is the sidechains that largely define its reactivity and its ability to be modified by the stabilizing reactions of tanning when leather is made. In addition, the chemistry of the backbone, defined by the peptide links, offers different reaction sites that can be exploited in some tanning processes. During the tanning process, modification of collagen by the chemistry of the tanning agent(s) affects the different features of the properties of the material; The hydrophilic-hydrophobic balance of the leather may be markedly affected by the chemistry of the tanning agent by changing the relationship between the leather and the solvent, which in turn could affect the equilibrium of any reagent between the solvent and the substrate. Also, the site of reaction between the reagent and the collagen may affect the isoelectric point of the collagen and consequently there could be a different relationship between pH and charge on the leather. The lower the isoelectric point, the more anionic or less cationic the charge on the material may be at any pH value: the higher the isoelectric point, the more cationic or less anionic the charge on the pelt will be at any pH value. Further, the relative reactions at the sidechains and the backbone of the protein could possible determine the type of reaction and hence the degree of stability of the tannage: the fastness of the reagent may be influenced by the interaction between reagents and the substrate.

Any type of tanned leather may be used, including metal tanned (e.g. using chromium, aluminium, zirconium, titanium, iron or combinations thereof), vegetable tanned (e.g. using tannins from bark or other sources), aldehydic tanning (e.g. using aldehydes) or natural tanning e.g. oil tanning.

Typically, the leather is tanned with chrome or vegetable tanned, with chrome tanned leather being most often used.

Tanning as a primary tanning may not be sufficient to maintain the desired characteristics and may therefore be retanned. The tannins used for this process may be different from those used in the primary tanning stage.

Fatliquoring refers to the process where fats/oils and waxes are fixed to the leather fibers. The primary function of fatliquoring is to prevent the fiber structure resticking during drying by providing an oil surface to the fiber structure. Any fatliquoring agents may be used, including anionic fatliquors such as sulfonated fatliquors and sulfited oils, soap fatliquors and cationic fatliquors. Nonionic fatliquors may also be used, including alkyl ethylene oxide condensates and protein emulsifiers. Multicharged fatliquors that are formulations of non-ionic, anionic and cationic fatliquors, may also be used for the fatliquoring process.

Raw material for the fatliquoring agents may be sea animal oils such as fish oil; land animal oils and fats such as claw oil, beef tallow, pig fat and bone fat; Vegetable oils and fats such as palm oil, sunflower oil, rapeseed oil, soybean oil, coconut fat, palm kernel fat and turkey red oil; waxes such as carnauba wax, montan wax and wool grease; synthetic fats such as paraffin oil, mineral oil, fatty alcohol and fatty acid ester.

As used herein, “at least one” is intended to mean one or more, i.e. 1, 2, 3, 4, 5, 6, 7, 8, 9, 10, etc.

The word “comprising” may be used as an open term, but it also includes the closed term “consisting of”.

It should be noted that the present invention may be applied with a special advantage in relation to dye, but that the apparatus and method described herein also may be applied for the processing of leather with retanning agent in general. A retanning or a part of a retanning process may thus be performed e.g. by the application of supplementary tanning agent such as inorganic or organic substances. Inorganic retanning agent which could be applied instead of the above identified dye this include chrome, aluminium, zirconium salts. Organic retanning agents include vegetable tannins, syntans, resins and aldehydes.

FIGURE REFERENCES

2. Providing a leather object
4. Leather object into process chamber
6. Subjecting to pressurized fluid
8. Introducing dyeing agent
10. Pressurized fluid in supercritical state
12. Reducing the pressure
14. Removing the leather object
16. Removing dyeing agent residue
18. Recirculating fluid
22. Providing a leather material
24. Cutting the material into objects
30. Leather object
32. Pre-cut leather object
34. Process chamber
36. Controllable compressor
38. High pressure storage container
40. Controller
42. Introducing member
44. Reducing member
46. Separator
48. Outlet
50. Residue outlet
52. Source of processing agent
54. Controllable inlet
56. Processing agent
70. Recirculation connection
80. Recirculation connection
82. Recirculation compressor
A. Ambient
CP. Critical point
G. Gas
L. Liquid
P. Pressure
S. Solid
SCF. Supercritical fluid
T. Time
Tinc. Time of pressure increase
Tred. Time of pressure reduction
IPgrad-iI. Pressure increase gradient
IPgrad-rI. Pressure reduction gradient
Td. Time of subjecting to dyeing agent

The invention claimed is:

1. A method for dyeing and/or retanning of leather objects, said method comprising steps of:
providing a leather object, which leather object has been processed by at least a tanning process,
introducing the leather object into a process chamber,
subjecting the leather object in the process chamber to a pressurized fluid,
controlling a pressure of the pressurized fluid to reach a supercritical state,
subjecting the leather object to a dyeing agent and/or a retanning agent, which dyeing or retanning agent is dissolved and/or transported in the pressurized fluid for at least a predefined period of time while the pressurized fluid is in the supercritical state,
reducing the pressure in the process chamber, and
removing the leather object from the process chamber, wherein the step of reducing the pressure in the process chamber comprises controlling the pressure reduction over time.

2. The method according to claim 1, wherein the step of reducing the pressure in the process chamber further comprises removing the pressurized fluid from the process chamber.

3. The method according to claim 1, further comprising the step of removing residue dyeing agent and/or retanning agent from the pressurized fluid during or after the pressurized fluid is removed from the process chamber.

4. The method according to claim 1, wherein the pressurized fluid that is removed from the process chamber is led to a storage container under storage pressure.

5. The method according to claim 1, wherein the dyeing agent is a collagen reactive dyeing agent.

6. The method according to claim 1, wherein an amount of dyeing agent and/or retanning agent is dosed in dependence of a weight, a thickness, and/or a surface area of the leather object.

7. The method according to claim 1, wherein an amount of dyeing agent and/or retanning agent is dosed in dependence of a type of the leather object.

8. The method according to claim 1, wherein the leather object is primed with a primer agent prior to being subjected to the pressurized fluid.

9. The method according to claim 1, further comprising a step of dosing the dyeing agent into the process chamber in an automated manner, based on leather object characteristics.

10. The method according to claim 1, wherein the step of subjecting the leather object to a dyeing agent and/or retanning agent, which dyeing agent or retanning agent is dissolved and/or transported in the pressurized fluid for at least a predefined period of time while the pressurized fluid is in the supercritical state, further comprises mixing, stirring, or circulation of the pressurized fluid in the supercritical state.

11. The method according claim 1, wherein the pressure of the pressurized fluid in the supercritical state is at least 70 bar.

12. The method according to claim 1, wherein a temperature of the pressurized fluid in the supercritical state is between 30 to 120 degrees Celsius.

13. The method according to claim 1, wherein a predetermined time, during which the leather object is subjected to the dyeing agent and/or the retanning agent in the pressurized fluid in the supercritical state, is at least 1 min.

14. The method according to claim 1, further comprising a step of providing a leather material, which leather material has been processed by at least a tanning process, whereby the at least one leather object is cut from the leather material prior to being provided and introduced into the process chamber.

15. The method according to claim 1, wherein a pressure reduction is controlled over time such that a reduction period exceeds 5 min.

16. The method according to claim 1, wherein a pressure reduction is controlled over time such that the pressure reduction does not exceed a predefined leather pressure reduction gradient of 10 bar/min.

17. The method according to claim 1, wherein the pressure of the pressurized fluid is controlled to reach the supercritical state such that the time period exceeds a predefined increase period of 5 min.

18. The method according to claim 1, wherein the pressurizing of the pressurized fluid in the process chamber to reach the supercritical state comprises that an increase of pressure does not exceed a predefined leather pressure increase gradient of 20 bar/min.

* * * * *